B. KREISCHER.
Brick Kiln.
No. 81,793.
2 Sheets—Sheet 1.
Patented Sept. 1, 1868.
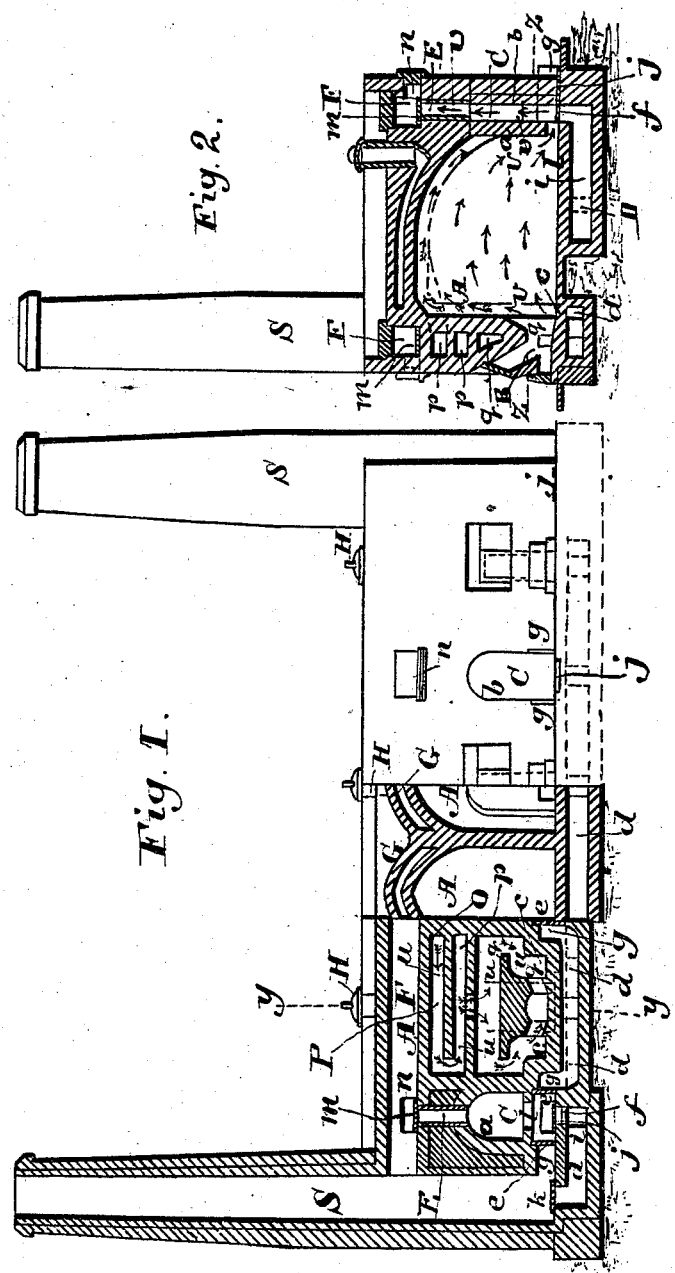
Witnesses:
Inventor:
Balthasar Kreischer

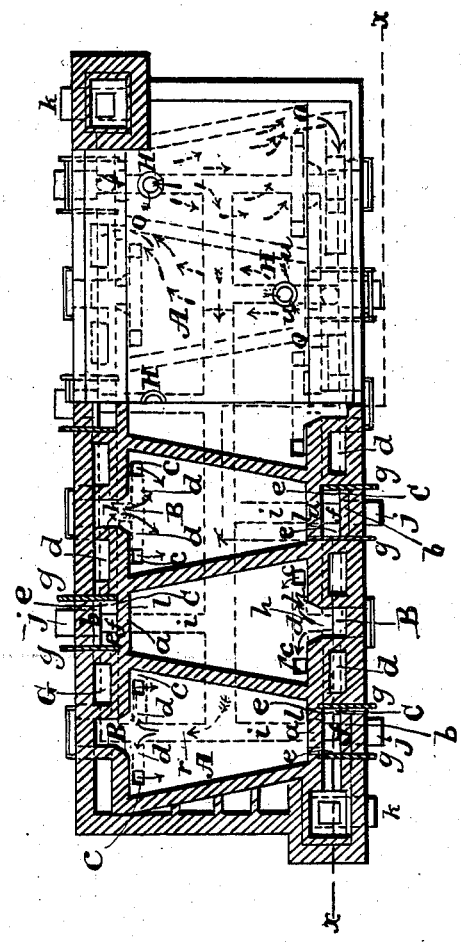

United States Patent Office.

BALTHASAR KREISCHER, OF NEW YORK, N. Y.

Letters Patent No. 81,793, dated September 1, 1868.

IMPROVED BURNING-KILN.

*The Schedule referred to in these Letters Patent and making part of the same.*

TO ALL WHOM IT MAY CONCERN:

Be it known that I, BALTHASAR KREISCHER, of the city, county, and State of New York, have invented a new and useful Improvement in Kilns for Burning Brick, Lime, Cement, Pottery, Terra-Cotta, and other substances or products, of which the following is a full, clear, and exact description, reference being had to the accompanying drawing, forming part of this specification, and in which—

Figure 1 represents a partly sectional side elevation of a kiln constructed in accordance with my improvement, said view being taken as indicated by the line $x\ x$ in fig. 3.

Figure 2, a transverse section, taken as denoted by the line $y\ y$ in fig. 1, and Figure 3 a partly sectional plan, the sectional portion of the view being taken as indicated by the line $z\ z$ in fig. 2.

Similar letters of reference apply to corresponding parts.

This, my improvement in kilns, consists in or embraces the following peculiarities or features, namely—

An arrangement for carrying off the gases and products of combustion through the doorways of the kilns, or double temporary walls and openings (having dampers,) communicating with a lower flue or adjoining kiln; also a top flue or flues, connecting with the space between said temporary walls, by means of tubes extending downwards through the arch of the doorway, for the purpose of carrying off the vapor or steam from the green material in a direct manner, and without bringing it into contact with the material in the next kiln.

Furthermore, the invention comprises a double arch to the kilns, in combination with channels in the side walls, and openings and tubes connected therewith, for heating, in a preparatory or preliminary manner, the atmospheric air, in its way to the fireplace, for the purpose of producing a more perfect and economical combustion; also serving to return the heat radiating from or through the arch and side walls back into the kiln.

And again, the invention includes a bottom flue, arranged under the floor of the kilns, with branches running to or from each kiln, for the purpose of establishing communication between either of the kilns, at opposite ends of a series, and either of the smoke-stacks, the same forming a hollow secondary floor, which prevents absorption of the heat by the ground, and drawing up of moisture therefrom into the kiln.

Referring to the accompanying drawing, A A A represent kilns, arranged side by side, so as to form a series, and of which there may be any desired number, the whole forming one general kiln, made up of separate kilns, that may either be worked separately or in unison, and that have their fireplaces, B, disposed on opposite sides of each successive kiln, that is, on the same side each alternate one, whereby the heated gases and products of combustion may be passed, without returning, and in a direct manner, from the one kiln to the next, and so on, if desired, in a zigzag course, throughout the series, as will be found hereinafter more fully described.

The kilns, thus arranged to form a row or stack, may be added to from time to time, as trade suggests, or the circumstances of the proprietor warrant.

Opposite to the fireplace of each kiln is a door or doorway, C, made up of temporary walls, $a\ b$, having an open space or passage-way between them, and which are broken down and built up each time it is required to take out the burnt material, and charge anew with green.

Furthermore, these kilns A A A are so constructed that in their transverse section they are largest at the grate or fireplace-end, and diminish towards the opposite extremity or back, whereby not only is there a more equable or perfect distribution of the heat throughout the material in the kiln, by reason of the greatest mass being in closest proximity to the fire, and the bulk diminishing in proportion to its distance therefrom, but also whereby the heated gases are collected, as it were, in a focus at the back end of the one kiln, prior to being admitted and expanded into the broader end of the next one, where, in case of green brick or other material being placed to be dried, or have its moisture expelled before burning, a reduced or diffused heat, such as is derived by the expansion of the heated gases as they escape from the previous kiln, in which a greater heat has been required to effect burning of the brick or other material therein. This is effectually secured by the reversely-tapered construction of the adjacent kilns.

Said kilns are provided in their base, near their broader or fireplace-ends, with two or more apertures, $c\ c$, which communicate with channels, $d\ d$, below, and by means of which, as hereinafter described, the heated gases and products of combustion are conveyed from one kiln to the next, as herein previously referred to.

The door or doorway C of each kiln, composed of temporary walls, $a\ b$, is made hollow, or, in other words, provided with spaces having openings, $e\ e$ and $f$, two of which, $e\ e$, controlled by dampers, $g\ g$, communicate, when open, by the passage or passages $d\ d$, with the next adjoining kiln or kilns, by the apertures $c\ c$, as indicated in part by arrows $h$. In the first and last kilns of the series, the one of these openings $e\ e$, when the damper $g$ controlling it is open, communicates direct with the one smoke-stack, S, next to which it is situated. The other opening, $f$, controlled by a damper, $j$, in the floor of the doorway C of each kiln, communicates with the central or main bottom flue D by a branch or passage, $i$, that is extended, so far as the two end kilns are concerned, to connect with the channels $d\ d$ of said kilns. The bottom flue D runs under the floor transversely to the position of each kiln, and terminates, through its connecting-passages $d$, in the smoke-stacks S S, that are provided with dampers, $k\ k$.

When it is required to charge or unload the kilns, the temporary walls $a\ b$, composing the doorway C, are broken down and removed. The inner one of these walls to each kiln has an opening, $l$, in or through it. In the arch of each doorway C, and communicating with the space between the two temporary walls thereof, is a tube or passage, E, terminating at its upper end in a top horizontal flue, F, that connects with the smoke-stack. These tubes E are provided with dampers, $m$, which may be operated through apertures, $n$, in the side walls.

Each kiln is constructed with a double arch, G, the space between the inner and outer arch communicating, through an opening, $o$, with zigzag channels, $p$, built in the side walls at the fireplace-end of the kilns, and terminating in a space, $q$, into and above the fireplace.

H H are tubes on top of every kiln, extending down through the upper arch, into the hollow space between the two arches, and provided with caps or covers, to open or close them at pleasure. This arrangement serves to heat the atmospheric air introduced to establish combustion, so as to improve the latter, and to return the heat passing off by radiation, as hereinbefore referred to, back to the fire. The arrows $u$ indicate the course of this current.

Supposing all the kilns to be filled with green bricks or other material to be burned, the doorways C are all closed or built up, as described, by the temporary walls $a\ b$, and the dampers closed, the apertures $c\ c$ in the two end kilns also being closed by covers. This done, a fire is kindled in the fireplace of the first or one end kiln, and the damper $m$ to the tube E opened, which allows of the steam rising from the brick, and entering by the opening, $l$, through which the draught is established, to pass off through the hollow space between the temporary walls $a\ b$, tube E, and flue F, into the smoke-stack. When the steam has all passed off, and the material is perfectly dry, or thereabouts, the damper $m$ is again made to close the tube E, and the slide or damper $g$ next to the second or adjoining kiln opened, and the heat of the first kiln passed off and expanded into the second kiln, as hereinbefore described, the heated gases entering through one of the openings $e$, passages $d$, and apertures $c$, for the purpose of drying and warming the green brick in the second kiln, prior to burning it. The vapor rising from the green material in this second kiln is passed off through the hollow doorway C of said kiln, and tube connecting it with the top flue F, on opening its damper $m$, as in the case of the first kiln, the dampers $g$ in the doorway C of the second kiln, meanwhile, being closed, after which, and when the brick is thoroughly dried and warmed, the communication with the flue F is shut off, and the damper $g$ next to the third kiln opened, in order to continue the process with reference to the remaining kilns, as has already been described with regard to the preceding ones. Meanwhile, at any period that may be desired, fires may be kindled in the second, in addition to the first kiln, to effect the burning of the brick, and in due course of time in the remaining kilns.

On arriving at the last kiln of the series, (counting from either end,) when the first kiln may, by such time, have been emptied of burnt material and refilled with green, the bottom damper $j$ in the doorway of the last kiln is opened, and the covers to the apertures $c\ c$ in the first kiln removed, and the damper $k$ in the smoke-stack closed. The heat of the last kiln will then pass, as indicated by the arrows $r$, along the bottom flue D, and enter the first kiln through its base-openings $c\ c$, drying and warming the green material in said kiln, and carrying off the vapor, as before, into the top flue F, on opening the damper controlling the tube E thereto, and from thence into the smoke-stack. The general and particular operation of the several kilns is then proceeded with as before. The passing of the heat along the bottom flue D prevents absorption of heat by the ground, and drawing up of moisture therefrom into the kiln.

It will be apparent, too, from the foregoing description, that either the continuous operations of all the kilns may be kept up, or any number of adjoining ones, by suitably opening and closing the dampers, or only a single kiln be worked, by carrying off the products of combustion direct through the bottom flue, accordingly as demand, or repair of certain of the kilns, or other circumstances require. In this my improvement is not based upon a mere arrangement of a number of kilns arranged side by side, as such alone would not effect the desired result or results.

The green material, as packed in one of the kilns, is represented by red lines in fig. 2, with the drying and warming current as passing through and around it, and up into the one top flue, F, as indicated by the arrows $v$.

What is here claimed, and desired to be secured by Letters Patent, is—

1. The arrangement of passages E F, controlled by dampers $m$, substantially as herein described, for carrying off the gases and products of combustion, through the doorways C of the kilns, and openings $e\ f\ d$, controlled by dampers $g$ and $j$, communicating with an adjoining kiln or lower flue D, as required.

2. The top flues F F, in combination with the hollow doorways C, and connecting-tubes or passages E, essentially as herein described.

3. The double arch G to the kilns, in combination with the openings or tubes H, and chamber or passages $p$, made in the side walls of the whole structure or fire-end of either kiln, and connecting with the grate or fireplace, as herein set forth.

4. The bottom flue D, arranged below the floor of the kilns, and transversely to them, in combination with branches running to or from each kiln, in direction of the length thereof, and connecting, by suitable openings, the kilns at their ends or doorways C, with either smoke-stack, and controlled by suitable dampers, substantially as and for the purposes specified.

BALTHASAR KREISCHER.

Witnesses:
  A. LE CLERC,
  E. P. TRACY.